(12) United States Patent  (10) Patent No.: US 9,291,454 B2
Rothbucher  (45) Date of Patent: Mar. 22, 2016

(54) STAKE-OUT MARKER

(71) Applicant: Georg Rothbucher, Bayerisch Gmain (DE)

(72) Inventor: Georg Rothbucher, Bayerisch Gmain (DE)

(73) Assignee: Georg Rothbucher, Bayerisch Gmain (DE)

(*) Notice: Subject to any disclaimer, the term of this patent is extended or adjusted under 35 U.S.C. 154(b) by 129 days.

(21) Appl. No.: 14/203,653

(22) Filed: Mar. 11, 2014

(65) Prior Publication Data

US 2014/0304996 A1  Oct. 16, 2014

(30) Foreign Application Priority Data

Apr. 12, 2013 (DE) .................... 20 2013 101 577 U

(51) Int. Cl.
*G01C 15/06* (2006.01)
*G01C 15/02* (2006.01)

(52) U.S. Cl.
CPC ............... *G01C 15/06* (2013.01); *G01C 15/02* (2013.01)

(58) Field of Classification Search
CPC ................................ G01C 15/06; G01C 15/02
USPC .................................. 33/293, 286, 405, 506
See application file for complete search history.

(56) References Cited

U.S. PATENT DOCUMENTS

| 3,599,336 | A | * | 8/1971 | Walsh | G01C 15/002 248/168 |
| 3,813,791 | A | * | 6/1974 | Stewart | G01C 15/06 33/263 |
| 4,311,382 | A | * | 1/1982 | Buckley | G01C 15/02 248/480 |
| 4,471,530 | A | * | 9/1984 | Kirven | G01B 11/24 33/286 |
| 4,803,784 | A | * | 2/1989 | Miller | G01C 15/06 33/293 |
| 4,875,291 | A | * | 10/1989 | Panique | G02B 7/1805 33/293 |
| 4,879,815 | A | * | 11/1989 | Vischer | G01B 5/25 33/286 |
| 4,970,794 | A | * | 11/1990 | Buckley | G01C 15/06 33/293 |
| 5,419,052 | A | * | 5/1995 | Goller | G01C 15/00 33/293 |
| 6,347,457 | B1 | * | 2/2002 | Espinoza | G01B 5/0025 33/286 |
| 7,669,341 | B1 | | 3/2010 | Carazo | |
| 7,886,450 | B1 | * | 2/2011 | Fiano | G01C 15/02 33/286 |
| 8,991,063 | B2 | * | 3/2015 | Eckhart | F41J 3/0004 273/407 |
| 2014/0325856 | A1 | * | 11/2014 | Rothbucher | G01C 15/06 33/293 |

FOREIGN PATENT DOCUMENTS

EP   1310765 A1   5/2003
WO   8704672      8/1987

OTHER PUBLICATIONS

International Search Report for European Patent Application EP14155498 dated Sep. 8, 2014.

* cited by examiner

*Primary Examiner* — Christopher Fulton
(74) *Attorney, Agent, or Firm* — McCormick, Paulding & Huber LLP

(57) ABSTRACT

In a stake-out marker for staking out buildings and the like with a foot plate (10) and a carrier plate (16) carrying a reflection element (22) the carrier plate (16) can be adjusted relative to the foot plate (10) between a transport position in which the carrier plate (16) lies substantially parallel to the foot plate (10) and a work position in which the carrier plate (16) stands vertically to the foot plate (10). The foot plate (10) has at least one perforation (48, 50, 56) with a first edge (52) running parallel to the carrier plate (16), standing in its work position, in the reference plane (20) of the reflection element (22), and with a second edge lying vertically to the first edge in a plane running vertically to the foot plate (10) through the center of the reflection element (22).

18 Claims, 3 Drawing Sheets

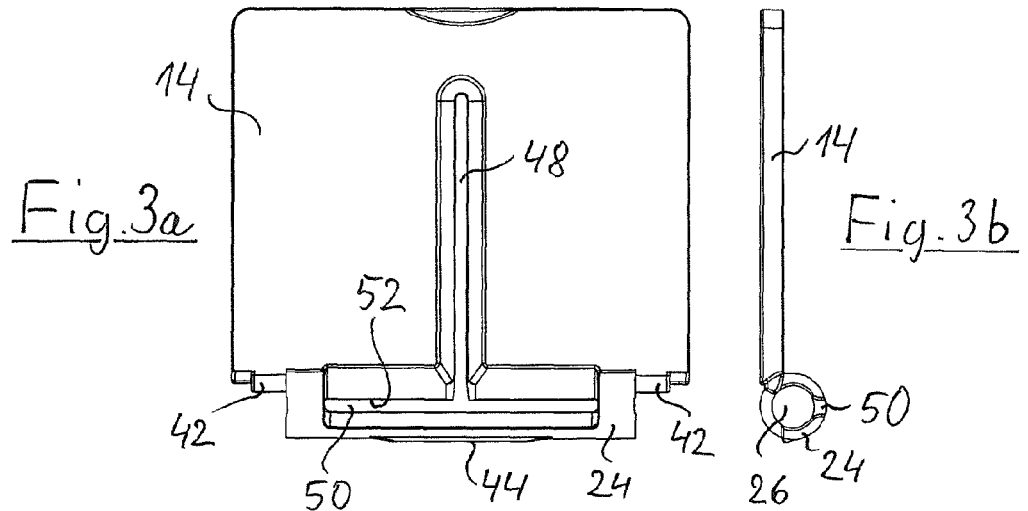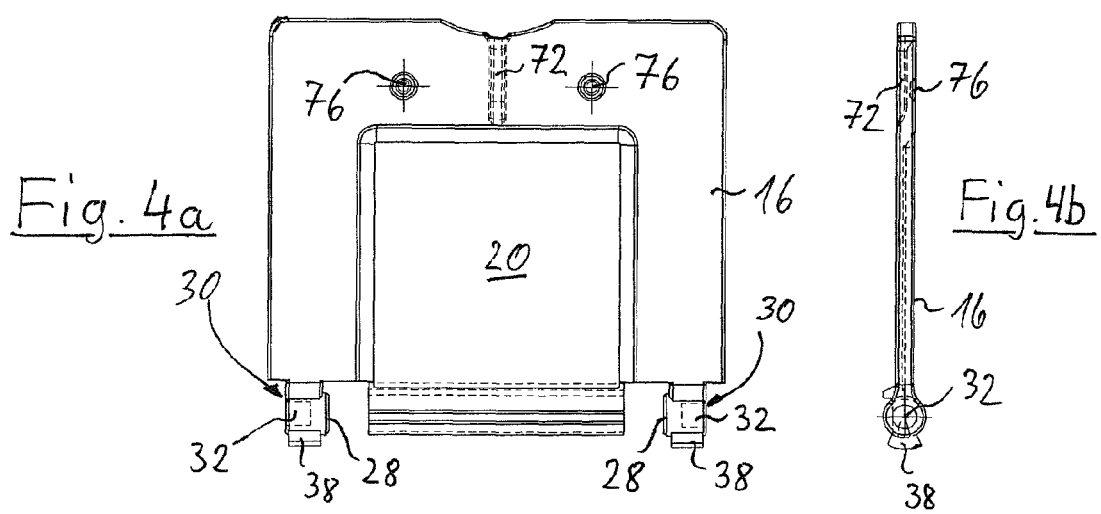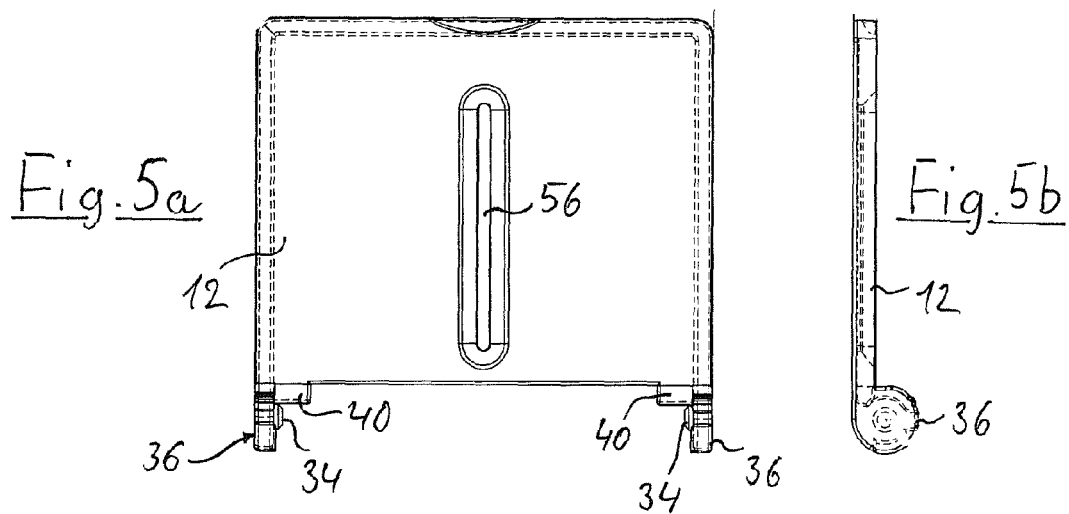

FIG. 6
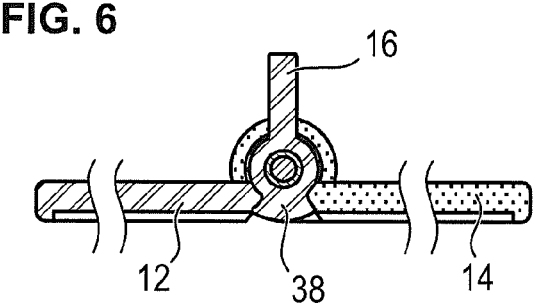
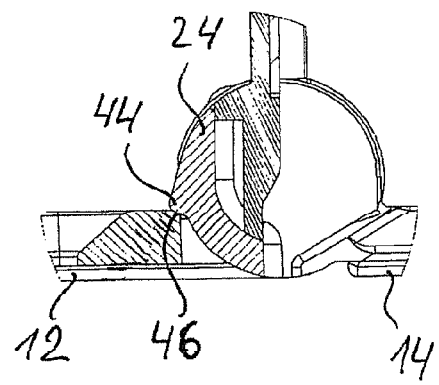
Fig. 7
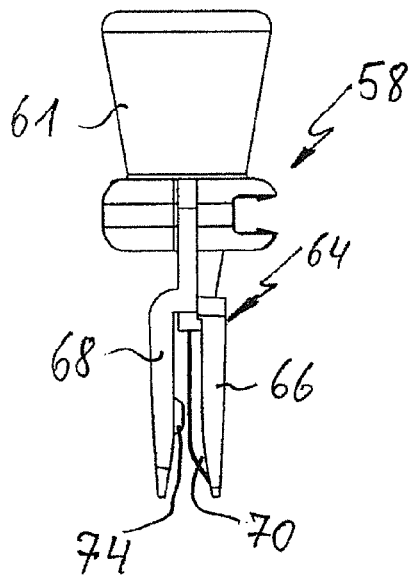
Fig. 8
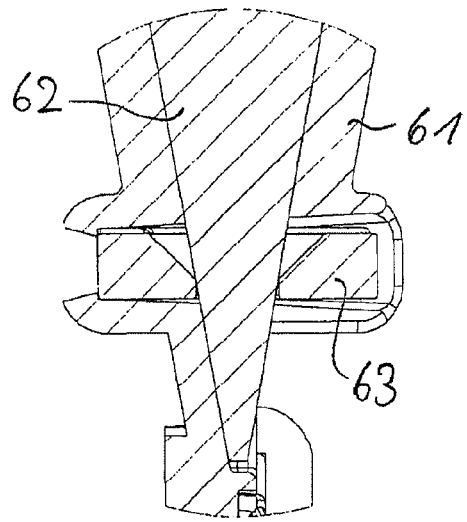
Fig. 9

STAKE-OUT MARKER

CROSS REFERENCE TO RELATED APPLICATION

Applicant hereby claims foreign priority benefits under U.S.C. §119 from German Utility Model Patent Application No. 20 2013 101 577.6 filed on Apr. 12, 2013, the contents of which are incorporated by reference herein.

TECHNICAL FIELD

The invention relates to a stake-out marker for staking out buildings and the like with a foot plate and a carrier plate carrying a reflection element.

BACKGROUND

Surveying plaquettes are known that carry a reflex film and can be placed flat on an object for fixing a surveying point or are also connected for example, to a holder so that they can be fastened on an object or into the ground. Furthermore, so-called angle plaquettes are known with at least two plates directed at a right angle to each other of which at least one carries a reflex film. The previously known surveying plaquettes or stake-out markers are frequently bulky and/or difficult to handle when fixing the surveying point.

SUMMARY

The invention has the basic task of indicating a stake-out marker of the initially cited type that can be handled comfortably and precisely, can be readily stored when not in use and is economical to manufacture.

In order to solve this task the invention suggests that in the case of the initially cited stake-out marker the carrier plate can be adjusted relative to the foot plate between a transport position in which the carrier plate lies substantially parallel to the foot plate and a work position in which the carrier plate stands vertically to the foot plate, and that the foot plate has at least one perforation with a first edge running parallel to the carrier plate, standing in its work position, in the reference plane of the reflection element, and with a second edge lying vertically to the first edge in a plane running vertically to the foot plate through the center of the reflection element.

The stake-out marker in accordance with the invention can be folded flat together when not being used so that it can be inserted comfortably in a pocket. In the set-up state it offers the possibility of immediately marking the surveying point found in that a line is drawn with a pencil on the support along the first edge and the second edge without the stake-out marker having to be moved out of its measured position for this. As a result, the surveying point can be rapidly and precisely sketched and the stake-out marker subsequently removed.

The foot plate and the carrier plate are preferably connected to one another by an articulation, whereby the carrier plate can advantageously be locked in a detachable manner in the work position relative to the foot plate. The locking can take place, for example, in that the catch element is formed on the carrier plate and/or on the foot plate that snaps during the pivoting of the carrier plate relative to the footplate into the work position of the carrier plate and is disengaged again by a certain pressure on the carrier plate during the folding together of the plates.

In a preferred embodiment an edge limiting the articulation slot between the carrier plate and the footplate is constructed as a first edge so that no perforation for it has to be provided in this direction.

In order to increase the stability of the stake-out marker on a support and thus facilitate its handling, it is advantageous if the foot plate comprises two plate sections that are at least approximately of the same size and that are articulated to one another in such a manner that that they can be folded between a first position in which they lie parallel to one another and a second position in which they are aligned with one another in a common plane. Thus, the stake-out marker offers in the position of use, i.e. in the second position of the plate sections, a large, solid standing surface and has on the other hand only small dimensions for transport.

The two plate sections are preferably connected by a common articulation to one another and to the carrier plate in such a manner that they enclose the carrier plate between themselves in their first position and therefore protect it. In the position of use the carrier plate stands centrally between the two plate sections and can therefore not fall over.

Cam elements are preferably formed on at least one of the plate sections and/or on the carrier plate in such a manner that that during the pivoting of the plate sections out of their first position into their second position the carrier plate is raised up out of the transport position into the work position. During the folding out of the two plate sections out of the transport position the carrier plate is therefore automatically moved into its work position.

The handling of the stake-out marker can be improved even more in that the slot-like perforation limited by the second edge is formed in both plate sections.

As a rule the reflection element arranged on the carrier plate is a flat reflex film. For greater distances such a target mark or reflection film is insufficient under certain circumstances and a surveying prism is required. For this, a so-called prism rod is generally used that can be set with the tip on a support and held vertically with the aid of a level. However, the handling of the prism rod is relatively bothersome since on the one hand the position of the rod on the support changes during the searching for the correct surveying point but at the same time the prism rod must be held vertically.

In order to eliminate these difficulties the invention suggests that a holder for a rod carrying a reflection element is arranged on the carrier plate of the stake-out marker in such a manner that the reference point or the reference plane of the reflection element provided on the rod coincides with the reference plane of the reflection element arranged on the carrier plate. This holder can distinctly simplify the handling of the rod, for example, of the prism rod, carrying the reflection element. It stands automatically vertically on the support and can be readily aligned by pushing the stake-out marker back and forth on the support. Once the surveying point has been found, it can be indicated on the support as described above.

The holder preferably has a conical insertion opening for receiving a conical end section of the rod. The rod can be reliably centered in the holder with it. The conical rod end preferably consists at least partially of a ferromagnetic material, whereby a magnet is arranged in the insertion opening of the holder. The rod is drawn into the insertion opening with it and centered and held fast at the same time. It can be withdrawn again from the insertion opening without difficulty and without the loosening of any locks. The holder can be in one piece with the carrier plate but can also be detachably connected to the carrier plate so that it is attached only when needed to the carrier plate. For example, the holder can be clipped onto the carrier plate.

The stake-out marker in accordance with the invention can be economically manufactured in that the plate sections of the foot plate and the carrier plate are extruded in one piece from plastic.

BRIEF DESCRIPTION OF THE DRAWINGS

The following description explains, in conjunction with the attached drawings, the invention using an exemplary embodiment. In the figures:

FIGS. 3a and 3b, 4a and 4b, 5a and 5b show a top view and a side view of a first plate section of the footplate, of the carrier plate and of a second section of the footplate, FIG. 6 shows a simplified view of the articulation area between the three plate sections articulated to each other with an articulated shaft directed vertically to the image plane, FIG. 7 shows an enlarged view of the articulated area between the plate sections for explaining the locking of the carrier plate, FIG. 8 shows a side view of the holder shown in FIG. 1 for a prism rod, and FIG. 9 shows a section containing the rod shaft through the holder in the area of the insertion opening of the holder.

DETAILED DESCRIPTION

Figure 1:
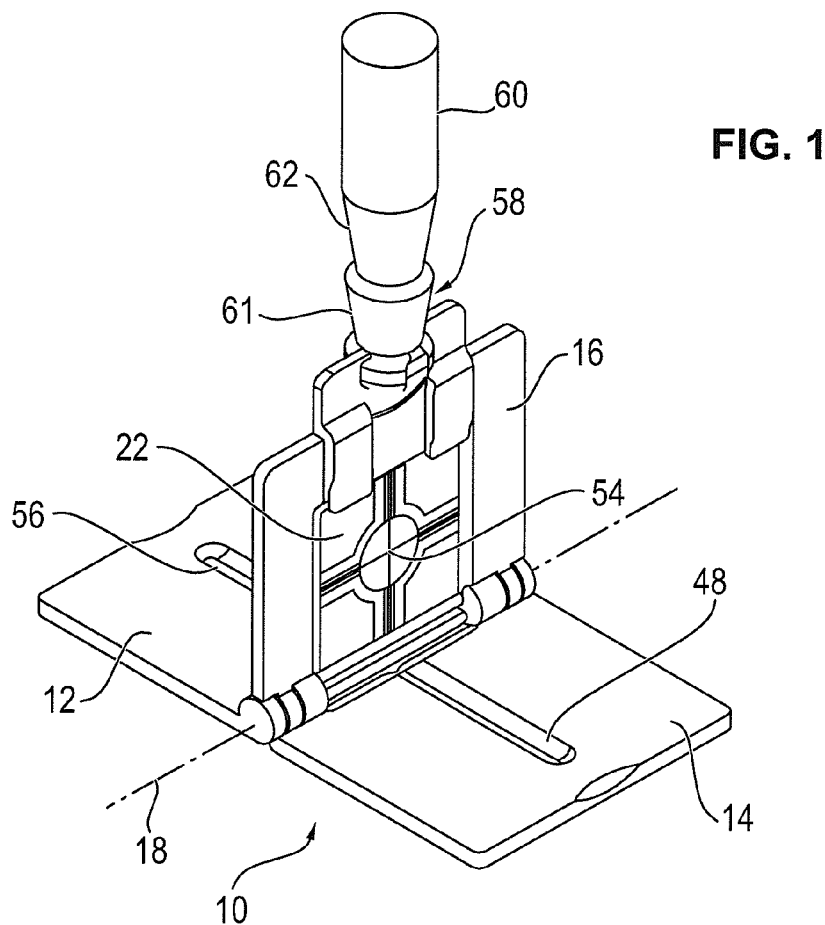
FIG. 1 shows a perspective view of a stake-out marker folded out into its work position and including a holder for a prism rod.
Figure 2:
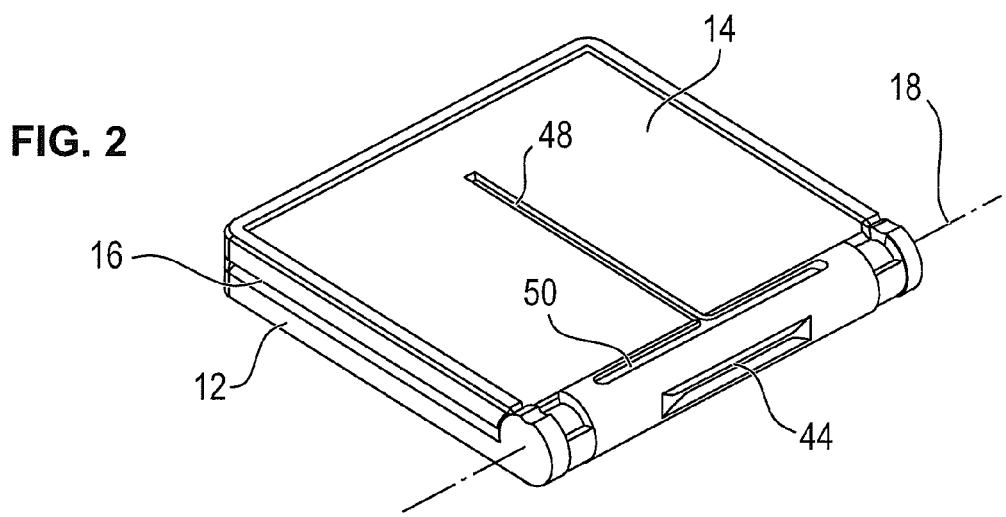
FIG. 2 shows a perspective view of the stake-out marker folded together in its transport position without the holder for the prism rod.

The stake-out marker shown in FIG. 1 comprises a foot plate, designated in general with 10, with a base plate 12 and a cover plate 14 that are both articulated to one another and to a carrier plate 16 in such a manner that they can be pivoted about a pivot shaft 18 between the work position of the stake-out marker shown in FIG. 1 and a transport position shown in FIG. 2.

The plates 12 to 16 are shown in the FIGS. 3a, b, 4a,b and 5a, b. FIGS. 4a, 4b show the carrier plate 16 that carries a reflex film or target marker 22 in a field 20. The plane of the field 20 forms the reference plane of the target marker 22. The cover plate 14 shown in the FIGS. 3a, 3b has a cylindrical attachment 24 along its lower edge in the front ends of which support openings 26 are formed. They serve to receive support pins 28 formed on two support continuations 30 on the lower edge of the carrier plate 16. The continuations 30 have, for their part, support openings 32 on their outer sides into which support pins 34 engage that are provided on two support continuations 36 formed on the lower edge of the base plate 12. The dimensions of the support pins 28 and 34 are selected in such a manner that by making use of the elasticity of the plastic material used for the manufacture of the plates the support pins 28 and 34 can be pressed into the particular support openings 26 and 32 in order to mount the three plates 12, 14 and 16 on each other.

Sector-shaped cam continuations 38 are formed on the support pins 28 of the carrier plate and are for cooperating with cam noses 40, 42 formed on the lower edge of the base plate 12 and of the cover plate 14. During the unfolding of base plate 12 and cover plate 14 the cam noses 40 and 42 strike the sector-shaped cam continuations 38 and automatically raise the carrier plate 16 up in this manner so that it stands in the work position shown in FIG. 1 vertically to the base plate 10. In this position the sector-shaped cam continuations 38 are clamped in between the cam noses 40 and 42 so that the carrier plate 16 retains its upright position (FIG. 6). In order to avoid an unintended folding together of the plate parts 12, 14, 16, an oblong catch noses 44 is formed on the outside circumferential surface of the cylindrical attachment 24 of the cover plate 14, which nose snaps in the folded-out state of the stake-out marker over the lower edge 46 of the base plate 12, as shown in FIG. 7.

A T-shaped perforation is formed in the cover plate 14 whose T shaft 48 is aligned vertically to the pivot shaft 18 and whose vertical T beam 50 extends through attachment 24 as a slot parallel to the shaft. This line 50 is designed in such a manner that one of its edges 52 lies at least approximately in the reference plane 20 of the reflection film 22. Thus, this edge can be used in order to draw a line characterizing the reference plane on the support with a pencil guided by the slot 50 without the stake-out marker having to be moved on the support. The shaft 48 of the T-shaped slot is aligned with the vertical line of the crosshairs 54 of the target marker and of the reflection film 22 so that the slot 48 can be used with its edges or one of its edges for drawing a line vertical to the edge 52 on the support. Therefore, the measured point can be rapidly and precisely sketched on the support. In order to increase the precision even more, a slot-shaped perforation 56 continuing the slot 48 is also formed in the base plate 12 so that a corresponding line can be drawn on the support so that the measured point can be precisely determined as the crossing of two lines.

Furthermore, FIG. 1 shows a holder 58 set on the carrier plate 16 and for a known prism rod 60. This rod carries a surveying prism (not shown) and usually a level in order to be able to align the prism rod 60 vertically to the support. This rod is provided on its lower end with a conical section 62.

Furthermore, the holder 58 has a conical rod receptacle 61 with the same conicity as the end section 62 of the prism rod 60. An annular magnet 63 is arranged in the lower area of this rod receptacle 61 and has the task of drawing prism rod 60 consisting at least in its conical end section 62 of a ferromagnetic material into the conical insertion opening of the rod receptacle 61 and holding it fast there.

Furthermore, the holder 58 comprises a fork-shaped clip 64 with a centrally located shank 66 on the one side and two shanks laterally offset relative to the first one on the other side. A rib 70 is formed on the inside of the shank 66 and is determined for engaging into a groove 72 formed on the carrier plate 16 and running vertically to the shaft 18. The two shanks 68 also carry a nub 74 on their inside that can engage into corresponding recesses 76 in the carrier plate 16 on both sides of the groove 72 (FIG. 4a). This ensures a centered seat of the holder 58 on the carrier plate 16, i.e., a position of the prism rod 16 in which its axis is aligned with the vertical line of the crosshairs 54 of the reflex film 22.

The holder 58 can be removed from the carrier plate 16 in the above-described exemplary embodiment so that the stake-out marker is especially space-saving and flat in the folded together state (FIG. 2). However, the rod receptacle 61 could also be firmly connected to the carrier plate 16 so that this part can be manufactured as a one-piece plastic extruded part.

While the present invention has been illustrated and described with respect to a particular embodiment thereof, it should be appreciated by those of ordinary skill in the art that various modifications to this invention may be made without departing from the spirit and scope of the present.

What is claimed is:

1. A stake-out marker for staking out buildings and the like with a foot plate and a carrier plate carrying a reflection element, wherein the carrier plate can be adjusted relative to the foot plate between a transport position in which the carrier plate lies substantially parallel to the foot plate and a work position in which the carrier plate stands perpendicularly to the foot plate, and that the foot plate has at least one slot with a first edge running parallel to the carrier plate, standing in its work position, in the reference plane of the reflection element, and with a second edge lying perpendicularly to the first edge in a plane running perpendicularly to the foot plate through the center of the reflection element, wherein the foot plate comprises two plate sections that are at least approximately of the same size and that are articulated to one another in such a manner that that they can be folded between a first position in which they lie parallel to one another and a second position in which they are aligned with one another in a common plane, and wherein cam elements are formed on at least one of the plate sections and/or on the carrier plate in such a manner that that during the pivoting of the plate sections out of their first position into the second position the carrier plate is raised up out of the transport position into the work position.

2. The stake-out marker according to claim 1, wherein the foot plate and the carrier plate are connected to one another by an articulation.

3. The stake-out marker according to claim 2, wherein an edge limiting the articulated slot between the carrier plate and the foot plate forms this first edge.

4. The stake-out marker according to claim 2, wherein the carrier plate can be detachably locked in its work position relative to the footplate.

5. The stake-out marker according to claim 2, wherein the foot plate comprises two plate sections that are at least approximately of the same size and that are articulated to one another in such a manner that that they can be folded between a first position in which they lie parallel to one another and a second position in which they are aligned with one another in a common plane.

6. The stake-out marker according to claim 1, wherein the carrier plate can be detachably locked in its work position relative to the footplate.

7. The stake-out marker according to claim 6, wherein a catch element bringing about the locking is formed on the carrier plate and/or on the foot plate.

8. The stake-out marker according to claim 7, wherein an edge limiting the articulated slot between the carrier plate and the foot plate forms this first edge.

9. The stake-out marker according to claim 6, wherein an edge limiting the articulated slot between the carrier plate and the foot plate forms this first edge.

10. The stake-out marker according to claim 1, wherein the two plate sections are connected by a common articulation to one another and to the carrier plate in such a manner that they enclose the carrier plate between themselves in their first position.

11. The stake-out marker according to claim 1, wherein the slot limited by the second edge is formed in both plate sections.

12. The state-out marker according to claim 1, wherein a holder for a rod carrying a reflection element that is arranged on the carrier plate in such a manner that the reference point or the reference plane of the reflection element arranged on the rod coincides with the reference plane of the reflection element arranged on the carrier plate.

13. A stake-out marker for staking out buildings and the like with a foot plate and a carrier plate carrying a reflection element, wherein the carrier plate can be adjusted relative to the foot plate between a transport position in which the carrier plate lies substantially parallel to the foot plate and a work position in which the carrier plate stands perpendicularly to the foot plate, and that the foot plate has at least one perforation with a first edge running parallel to the carrier plate, standing in its work position, in the reference plane of the reflection element, and with a second edge lying perpendicularly to the first edge in a plane running perpendicularly to the foot plate through the center of the reflection element, wherein a holder for a rod carrying the reflection element that is arranged on the carrier plate in such a manner that the reference point or the reference plane of the reflection element arranged on the rod coincides with the reference plane of the reflection element arranged on the carrier plate.

14. The stake-out marker according to claim 13, wherein the holder has an insertion receptacle with a conical insertion opening for receiving a conical end section of the rod.

15. The stake-out marker according to claim 14, wherein the conical rod end consists at least partially of a ferromagnetic material, and that a magnet is arranged in the rod receptacle of the holder.

16. The stake-out marker according to claim 13, wherein the holder is in one piece with the carrier plate.

17. The stake-out marker according to claim 13, wherein the holder can be detachably connected to the carrier plate.

18. The stake-out marker according to claim 17, wherein the holder can be clipped onto the carrier plate.

* * * * *